United States Patent [19]

Everett

[11] Patent Number: 5,425,393
[45] Date of Patent: Jun. 20, 1995

[54] BACKFLOW PREVENTION AND DETECTION SYSTEM

[75] Inventor: Jon A. Everett, Atascadero, Calif.

[73] Assignee: Zurn Industries, Inc., Erie, Pa.

[21] Appl. No.: 166,812

[22] Filed: Dec. 15, 1993

[51] Int. Cl.$^6$ .......................... E03C 1/10; F16K 37/00
[52] U.S. Cl. ...................... 137/218; 137/107; 137/554
[58] Field of Search .................. 137/107, 218, 554

[56] References Cited

U.S. PATENT DOCUMENTS

| | | | |
|---|---|---|---|
| 3,462,994 | 8/1969 | Maust | 73/4 |
| 3,529,625 | 9/1970 | Ferrari | 137/554 |
| 3,837,357 | 9/1974 | Slaughter, Jr. | 137/554 |
| 3,942,551 | 3/1976 | Schuller et al. | 137/514 |
| 4,518,006 | 5/1985 | Hoffmann et al. | 137/218 |
| 4,624,279 | 11/1986 | Arens et al. | 137/218 |
| 4,805,665 | 2/1989 | League | 137/554 |
| 4,921,006 | 5/1990 | Evans | 137/554 |
| 4,971,094 | 11/1990 | Gonzalez | 137/38 |
| 4,991,655 | 2/1991 | McHugh | 169/16 |
| 5,031,661 | 7/1991 | Feuz | 137/614.2 |

OTHER PUBLICATIONS

Z-3004SS Pressure-Tru Series 2½" Automatic Fire Control Valves With Integral Supervisory Switch, Zurn Industries, Inc., Wilkins Regulator Div. (1 sheet) (undated).

3004-60SS Supervisory Switch, Zurn Industries, Inc., Wilkins Regulator Div. (1 sheet) (May 1991).

Zurn Pressure-Tru Pressure Reducing Fire Sprinkler & Fire Hose Valves, Zurn Industries, Inc., Wilkins Regulator Division (12 pp.) (undated).

*Primary Examiner*—Gerald A. Michalsky
*Attorney, Agent, or Firm*—Webb Ziesenheim Bruening Logsdon Orkin & Hanson

[57] ABSTRACT

A backflow prevention assembly is disclosed which provides for detection of backflow conditions. The backflow preventer assembly includes a housing having an inlet, an outlet and a discharge opening. A pair of independent check valves is positioned within the housing between the inlet and the outlet. The check valves are mechanically and hydraulically independent from each other and each adapted to seal the inlet from the outlet during backflow conditions. A relief valve is positioned within the housing between the check valves to selectively seal the discharge opening. An alarm is coupled to the relief valve to provide a signal when the relief valve is opened indicating backflow and discharge conditions.

12 Claims, 3 Drawing Sheets

BACKFLOW PREVENTION AND DETECTION SYSTEM

BACKGROUND OF THE INVENTION

1. Field of the Invention

The present invention relates to backflow prevention assembly and, more specifically, to a backflow prevention assembly which includes a detection system for detecting backflow conditions.

2. Background Information

Backflow prevention assemblies have long been used to prevent a fluid source, such as a source of drinking water, from being contaminated with potentially unsafe liquids within a distribution system to which the fluid source is connected. A typical situation includes connection of drinking water supply to process systems of industrial buildings, steam boilers, pressure steam cookers, irrigation systems and fire suppression systems. Government regulations typically require the use of a backflow preventer when such cross connections are present.

Most modern building codes require that backflow preventers include a pair of independently spring-loaded positive check valves connected in tandem within the backflow preventer. The pair of check valves are provided so that each can serve as a backup in case the other should fail. In the event that both check valves should become fouled or otherwise fail, a discharge and a relief valve are often positioned between the first and second check valves. In this manner, if both check valves should fail during backflow conditions, the system will be emptied by the actuation of the relief valve opening the discharge. Examples of such check valves and relief valve systems can be found in U.S. Pat. No. 4,991,655 to McHugh. Further examples are Wilkins Backflow Preventer Models 975 and 975DA sold by Wilkins Regulator Division of Zurn Industries, Inc. The disadvantage of these prior art systems is that there is no indication as to when the relief valve is open and backflow condition is occurring. This presents a large problem in areas where the discharge is positioned in locations susceptible to flood damage, such as hidden areas or areas protected from freezing, or in areas where there is a high premium for water.

It is an object of the present invention to overcome the problems of these prior art systems. It is a further object of the present invention to provide a backflow prevention and detection system which provides a simple, effective and efficient mechanism for preventing backflow and indicating when backflow conditions are present.

SUMMARY OF THE INVENTION

The object of the present invention is achieved by providing a backflow prevention and detection system which includes a housing having an inlet, an outlet and a discharge opening therein. A pair of independent check valves is positioned between the inlet and the outlet and each configured to selectively seal between the inlet and the outlet. A relief valve is positioned adjacent the discharge opening to selectively open the discharge opening under backflow conditions. An alarm is coupled to the relief valve to signal when the relief valve and associated discharge opening are opened.

In a preferred embodiment of the present invention the inlet of the housing is coupled to an upstream fluid source and the outlet is coupled to a downstream fluid distribution system. The first check valve is positioned between the inlet and the outlet and configured to selectively close to prevent backflow between the downstream fluid distribution system and the upstream fluid source. The second check valve is positioned between the first check valve and the outlet and also configured to close, preventing backflow between the downstream fluid distribution system and the upstream fluid source. The relief valve is positioned adjacent the discharge opening between the first check valve and the second check valve. The relief valve is movable between a closed position sealing the discharge opening and an open discharge position. The discharge opening of the housing is in fluid communication with the outlet when the second check valve is opened and the relief valve is in the opened discharge position. The alarm is coupled to the relief valve for signaling when the relief valve is positioned in the open discharge position indicating backflow conditions.

In one preferred embodiment of the present invention, the relief valve includes a relief valve seat threadably mounted in the housing with a relief valve sealing member movable between a position sealed against the relief valve seat closing the discharge opening and a position spaced from the relief valve seat. A diaphragm assembly is coupled to the relief valve sealing member and configured to move the relief valve sealing member between the sealed position and the spaced position. The alarm includes a switch to activate the alarm and a plunger positioned between the switch and the diaphragm assembly wherein the plunger is configured to activate the switch when the diaphragm has moved the relief valve seat to the spaced position. The diaphragm assembly may include a flexible diaphragm mounted on the housing forming an upstream chamber and a downstream chamber on opposed sides of the diaphragm with a passage in the housing extending from the inlet to the upstream chamber. The diaphragm assembly may further include a first diaphragm mounting flange positioned in the downstream chamber attached to the relief valve sealing member and a second diaphragm mounting flange attached to the first diaphragm mounting flange to clamp the diaphragm therebetween. A central bore may be provided within a cylindrical extension of the second diaphragm mounting flange, wherein the central bore is configured to receive the plunger therein. An O-ring may be positioned on the cylindrical extension of the second diaphragm mounting flange to provide a fluid seal between the cylindrical extension and the housing.

Other features of the preferred embodiment of the present invention include that the alarm may be coupled to an audible alarm. The switch of the alarm mechanism may be positioned in a protective alarm housing which is attached to the housing of a backflow preventer. The diaphragm assembly may further include a spring extending between the housing and the first diaphragm mounting flange to bias the relief valve to the spaced position. Additionally, each check valve may include a check valve seat threaded into the housing and a check valve sealing assembly threaded into the housing, with the check valve sealing assembly including a check valve sealing member and a spring biasing the check valve sealing member against the check valve seat.

These and other objects of the present invention will be clarified in the description of the preferred embodiment taken in connection with the attached drawings, wherein like reference numerals represent like characters throughout.

BRIEF DESCRIPTION OF THE PREFERRED EMBODIMENT

Figure 1:
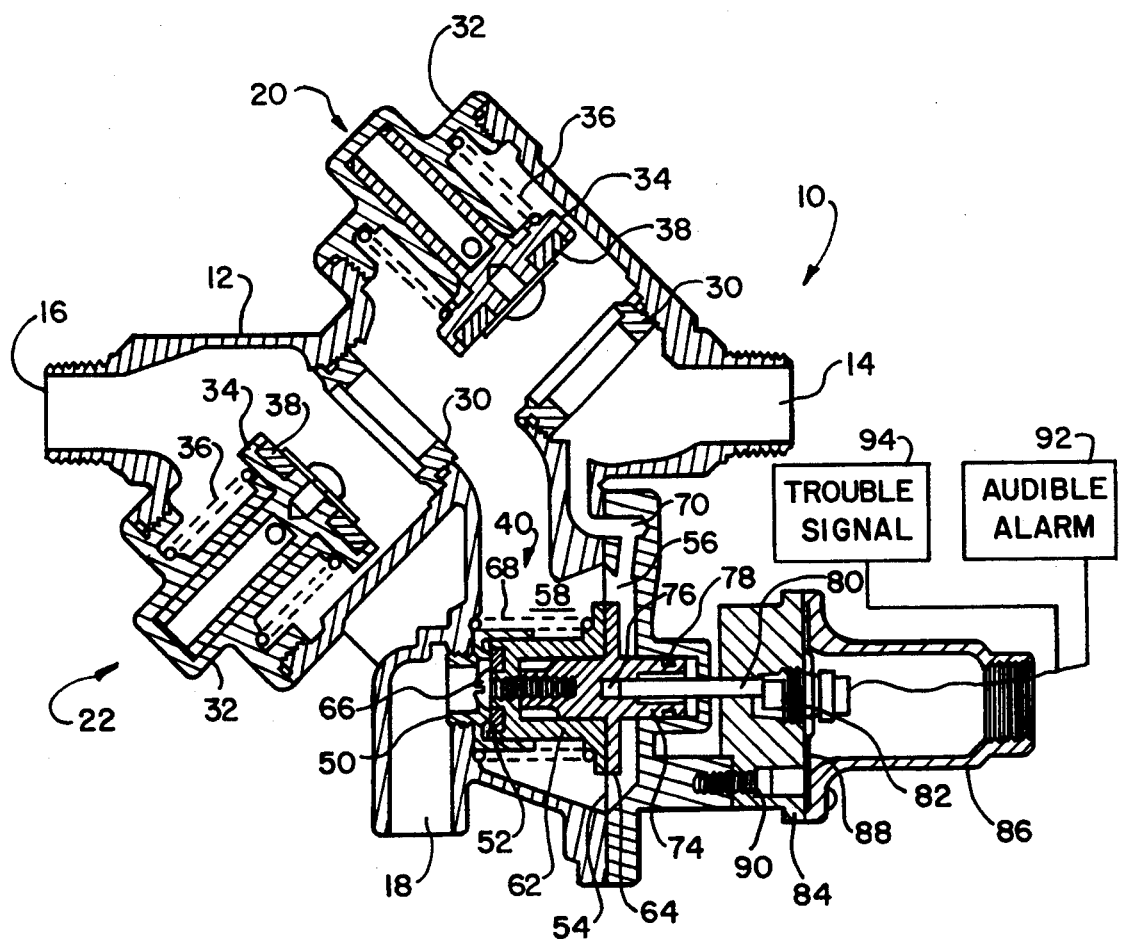
FIG. 1 illustrates the backflow prevention and detection system according to the present invention, with the system in an open flow-through condition.
Figure 2:
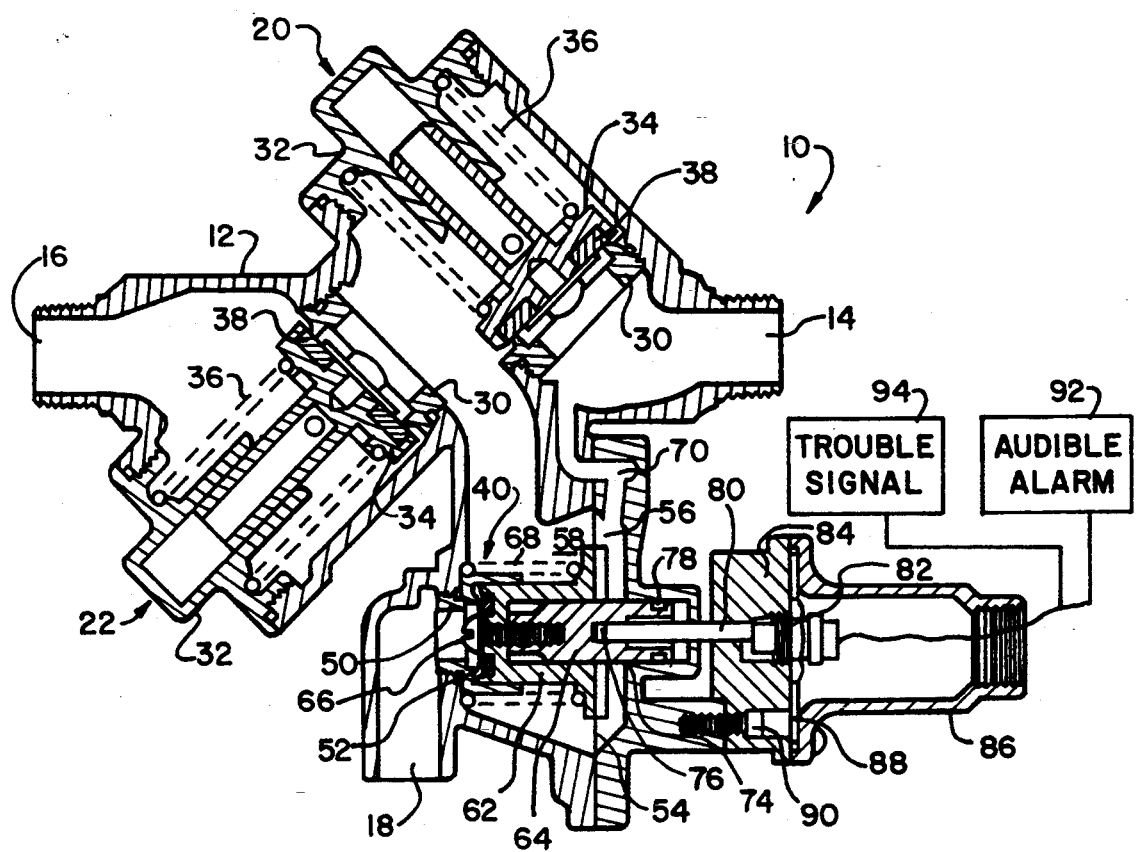
FIG. 2 represents the backflow prevention and detection system of FIG. 1 with the first and second check valves in a closed position.
Figure 3:
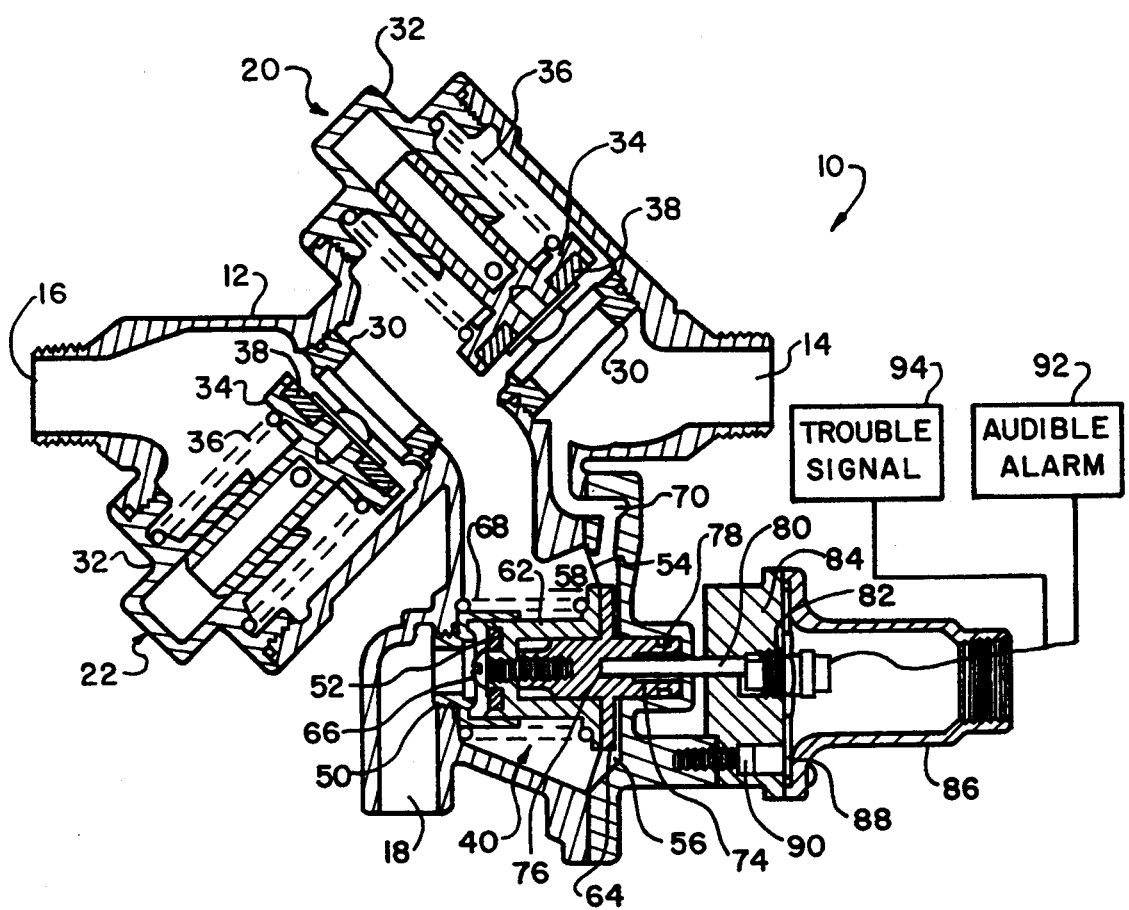
FIG. 3 illustrates the backflow prevention and detection system of FIGS. 1 and 2 operating in a backflow discharge position.

A backflow prevention and detection assembly 10 according to one embodiment of the present invention is illustrated in FIGS. 1–3. The assembly 10 includes a housing 12 having an inlet 14, an outlet 16 and a discharge opening 18 therein. The inlet 14 and the outlet 16 are threaded for easy coupling to appropriate inlet and outlet pipes (not shown). Additionally, discharge opening 18 may also be threaded or, alternatively, any of the openings 14, 16 and 18 may be formed in another conventional fashion for easy attachment to associated piping.

A first check valve 20 is positioned within the housing 12 between the inlet 14 and the outlet 16. A second check valve 22 is positioned within the housing 12 between the first check valve 20 and the outlet 16. The first check valve 20 and the second check valve 22 are hydraulically and mechanically independent of each other. Each check valve 20 and 22 is adapted to selectively close to prevent fluid flow between the inlet 14 and the outlet 16. Each of the check valves 20 and 22 is of a known type, found for example in Wilkins Backflow Preventer Models 975 and 975DA sold by Wilkins Regulator Division of Zurn Industries, Inc.

Each of the check valves 20 and 22 includes a check valve seat 30 threaded into the housing 12. A check valve sealing assembly is threaded into the housing in a position opposed from the check valve seat 30. The check valve sealing assembly includes a base 32 which is threaded into the housing 12, a reciprocating sealing member 34 which is configured to seal against the check valve seat 30 and a biasing spring 36 extending between the base 32 and the sealing member 34 to bias the sealing member 34 into sealing engagement with the check valve seat 30. The sealing member 34 can preferably include a rubber sealing ring 38 to provide a tighter seal against the check valve seat 30.

A relief valve 40 is positioned between the first check valve 20 and the second check valve 22 adjacent the discharge opening 18. The relief valve 40 is adapted to selectively seal the discharge opening 18.

The relief valve 40 includes a relief valve seat 50 threadably mounted in the housing 12. A relief valve sealing member 52 is mounted for reciprocal movement and configured to selectively seal against the relief valve seat 50. The relief valve sealing member 52 is coupled to a diaphragm assembly which will move the relief valve sealing member 52 between the sealed position adjacent the relief valve seat 50 and a position spaced from the relief valve seat 50.

The diaphragm assembly includes a flexible diaphragm 54 mounted in the housing 12 forming an upstream chamber 56 and a downstream chamber 58 on opposed sides of the diaphragm 54. A first diaphragm mounting flange 62 is positioned in the downstream chamber 58 and a second diaphragm mounting flange 64 is positioned within the housing 12 and attached to the first diaphragm mounting flange 62 to clamp the diaphragm 54 therebetween. A bolt 66 is threadably secured to the first diaphragm mounting flange 62 and the second diaphragm mounting flange 64 to secure the mounting flanges 62 and 64 together, to clamp the diaphragm between the mounting flanges 62 and 64 and to clamp the relief valve sealing member 52 to the first diaphragm mounting flange 62. A spring 68 extends between the housing 12 and the first diaphragm mounting flange 62 to bias the diaphragm assembly and the attached relief valve sealing member 52 to the position spaced from the relief valve seat 50.

The housing includes a passage 70 extending from the inlet 14 to the upstream chamber 56 to provide fluid communication therebetween.

The second diaphragm mounting flange 64 includes a cylindrical extension 74 with a central bore 76 provided therein. An O-ring 78 surrounds the cylindrical extension 74 and cooperates with a cylindrical portion of the housing 12 to provide a fluid tight seal therebetween. A reciprocating plunger 80 is received within the central bore 76 of the cylindrical extension 74. The plunger is positioned adjacent a push-button microswitch 82. The switch 82 is threadably attached to a bracket 84 and further covered by a bell cover 86 sealing to the bracket 84 by an O-ring 88 and attached thereto by two screws. Preferably, at least one of the screws is tamper resistant. The bracket 84 has two holes drilled therethrough. One hole allows for the attachment of the bracket 84 and associated bell cover 86 to the housing 12 by bolt 90. The other hole within the bracket 84 allows the plunger 80 to be in contact with the switch 82.

The switch 82 is electrically connected, such as by electrical wiring through bell cover 86, to an audible alarm 92 and a trouble signal 94 which may be located on a remote electrical control panel. The alarm 92 may also include a visual indication of status. The push-button switch 82 acts to complete the circuit for activating both the alarm 92 and the trouble signal 94.

The operation of the backflow prevention and detection assembly 10 will now be described. FIG. 1 illustrates the backflow prevention and detection assembly 10 operating in a normal flow-through condition where fluid is flowing from an upstream source (not shown) into the inlet 14, through the backflow prevention and detection assembly 10 and out of the outlet 16 to a downstream distribution system (not shown) having a pressure lower than that of the fluid source. There is a pressure drop across each of the check valves 20 and 22. Consequently, there is a pressure difference between the fluid in the upstream chamber 56, which communicates with the inlet 14 through passage 70, and the fluid in the downstream chamber 58 on either side of the diaphragm 54. This pressure differential is sufficient to overcome the force of the spring 68 and maintain the relief valve 40 in a closed, sealed condition, sealing off the discharge opening 18. Additionally, the pressure drop is sufficient to overcome the force of the springs 36 of the check valves 20 and 22. This configuration allows the fluid to flow from the inlet 14 to the outlet 16 in a normal fashion.

In the event that the pressure in the downstream distribution system and the outlet 16 should become substantially equal to or greater than the pressure of the fluid distribution source, the first and second check valves are arranged to close, as shown in FIG. 2. Each check valve 20 and 22 will independently serve to prevent fluid from flowing back through the backflow prevention and detection assembly 10 into the upstream fluid source. The relief valve 40 should remain closed since the pressure in the upstream chamber 56 should be greater than the pressure in the downstream chamber 58 to maintain the relief valve 40 in the closed position. FIG. 2 may represent the standard operative position of the backflow prevention and detection assembly 10 where the downstream distribution system is normally closed, such as a fire suppression system. In such a fire suppression system, the downstream distribution system will normally remain closed until a sprinkler is opened. In the closed condition, there will not be a sufficient pressure drop and the check valves 20 and 22 will close until a downstream sprinkler is opened.

Sometimes one or both of the check valves 20 and may be fouled and remain open when they should be closed. FIG. 3 illustrates the backflow prevention and detection assembly 10 where the pressure in the downstream distribution system is greater than or equal to the pressure in the upstream fluid source and the check valves 20 and 22 have not closed, such as due to scale buildup. This condition creates a backflow condition which will open the relief valve 40.

In such a backflow condition, the pressure in the downstream chamber 58 will be substantially equal to or greater than the pressure in the upstream chamber 56 thereby allowing the spring 68 to move the relief valve sealing member 52 from the relief valve seat 50 and open the discharge opening 18. The fluid from the downstream distribution system will then flow through the discharge opening 18 preventing contamination of the upstream fluid source. The movement of the relief valve sealing member 52 and attached diaphragm mounting flanges 62 and 64 will also cause the plunger 80 to be pushed against the push-button switch 82 thereby activating the audible alarm 92 and the trouble signal 94. The plunger is moved by the end surface of the central bore 76 into engagement with the push-button switch 82. This detection system provides for appropriate indications of the backflow condition and discharge which are occurring. The notification of the backflow condition can help prevent excessive flood damage.

This specific arrangement allows for an economical, efficient backflow assembly satisfying appropriate building codes and regulations as well as providing for an effective, efficient alarm mechanism for indicating the presence of backflow and discharge conditions.

The provision of the alarm mechanism will have great interest in areas susceptible to freezing which mandate that the backflow prevention mechanism be placed in areas that do not freeze. These nonfreezing areas are often inaccessible to people and prone to flood damage. Additionally, the alarm system is also particularly useful in areas where water is at a premium.

It will be appreciated by those of ordinary skill in the art that various modifications may be made to the present invention without departing from the spirit and scope thereof. Consequently, the scope of the present invention is intended to be interpreted by the following claims.

What is claimed is:

1. A backflow prevention and detection system comprising:
   a housing;
   an inlet positioned in said housing coupled to an upstream fluid source;
   an outlet positioned in said housing coupled to a downstream distribution system;
   a first check valve positioned between said inlet and said outlet configured to selectively close, wherein said first check valve in said closed position will prevent fluid flow through said first check valve and between said inlet and said outlet;
   a second check valve positioned between said first check valve and said outlet configured to selectively close, wherein said second check valve in said closed position will prevent flow through said second check valve and between said inlet and said outlet;
   a relief valve positioned between said first check valve and said second check valve, said relief valve movable between a closed position and an open discharge position, said relief valve moving to said open discharge position when the pressure in the downstream distribution system is greater than or equal to the pressure in the upstream fluid source and being independent of said closing of said first check valve and said second check valve;
   a discharge opening in fluid communication with said outlet when said second check valve is positioned in said open position and said relief valve is in said open discharge position; and
   an alarm means coupled to said relief valve for signaling when said relief valve is positioned in said open discharge position.

2. A backflow prevention and detection system comprising:
   a housing;
   an inlet positioned in said housing coupled to an upstream fluid source;
   an outlet positioned in said housing coupled to a downstream distribution system;
   a first check valve positioned between said inlet and said outlet configured to selectively close to prevent fluid flow between said inlet and said outlet;
   a second check valve positioned between said first check valve and said outlet configured to selectively close to prevent flow between said inlet and said outlet;
   a relief valve positioned between said first check valve and said second check valve, said relief valve movable between a closed position and an open discharge position, wherein said relief valve includes:
   a relief valve seat mounted in said housing;
   a relief valve sealing member movable between a position sealed against said relief valve seat and a position spaced from said relief valve seat when said relief valve is in said closed position and said open discharge position, respectively;
   a diaphragm assembly coupled to said relief valve sealing member and configured to move said relief valve sealing member between said sealed position and said spaced position;
   a discharge opening a fluid communication with said outlet when said second check valve is positioned in said open position and said relief valve is in said open discharge position; and an alarm means coupled to said relief valve for signaling when said relief valve is positioned in said open discharge position, wherein said alarm means includes a switch to activate said alarm means when said diaphragm assembly moves said relief valve sealing member to said spaced position.

3. The system of claim 2 wherein said diaphragm assembly includes a flexible diaphragm mounted in said housing forming an upstream chamber and a downstream chamber on opposed sides of said diaphragm.

4. The system of claim 3 further including a passage in said housing extending from said inlet to said upstream chamber.

5. The system of claim 4 wherein said diaphragm assembly further includes:
   a first diaphragm mounting flange positioned in said downstream chamber attached to said relief valve sealing member; and
   a second diaphragm mounting flange attached to said first diaphragm mounting flange to clamp said diaphragm therebetween, and wherein a central bore is provided within a cylindrical extension of said second diaphragm mounting flange.

6. The system of claim 5 further including an O-ring positioned on said cylindrical extension of said second diaphragm mounting flange to provide a fluid seal between said cylindrical extension and said housing.

7. The system of claim 6 wherein said diaphragm assembly further includes a spring extending between said housing and said first diaphragm mounting flange to bias said relief valve seat to said spaced position.

8. The system of claim 6 wherein said alarm means includes an audible alarm.

9. The system of claim 6 wherein said switch is positioned in an alarm housing which is attached to said housing.

10. The system of claim 5 wherein said relief valve seat is threaded into said housing.

11. The system of claim 5 wherein each said check valve includes a check valve seat threaded into said housing, and a check valve sealing assembly threaded into said housing, said check valve sealing assembly including a check valve sealing member and a means for biasing said check valve sealing member against said check valve seat.

12. A backflow prevention and detection assembly comprising:
   a housing having an inlet, an outlet and a discharge opening therein;
   a pair of independent check valves positioned within said housing, each said check valve configured to selectively close to seal said inlet from said outlet, wherein each said check valve will prevent fluid flow through said check valve in said closed position;
   a relief valve positioned within said housing between said check valves configured to selectively seal said discharge opening, said relief valve opening when the pressure in a downstream distribution system is greater than or equal to the pressure in an upstream fluid source and each said check valve has not closed; and
   an alarm means coupled to said relief valve for signaling when said relief valve has opened said discharge opening, wherein said alarm means operates independently of said closing of each said check valve.

* * * * *